United States Patent
Xiu et al.

(10) Patent No.: US 11,979,583 B2
(45) Date of Patent: May 7, 2024

(54) METHODS AND DEVICES FOR BIT-WIDTH CONTROL FOR BI-DIRECTIONAL OPTICAL FLOW

(71) Applicant: BEIJING DAJIA INTERNET INFORMATION TECHNOLOGY CO., LTD., Beijing (CN)

(72) Inventors: Xiaoyu Xiu, San Diego, CA (US); Yi-Wen Chen, San Diego, CA (US); Xianglin Wang, San Diego, CA (US)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 214 days.

(21) Appl. No.: 17/476,252

(22) Filed: Sep. 15, 2021

(65) Prior Publication Data
US 2022/0007030 A1    Jan. 6, 2022

Related U.S. Application Data

(63) Continuation of application No. PCT/US2020/023027, filed on Mar. 16, 2020.
(Continued)

(51) Int. Cl.
*H04N 19/146* (2014.01)
*H04N 19/107* (2014.01)
(Continued)

(52) U.S. Cl.
CPC ......... *H04N 19/146* (2014.11); *H04N 19/107* (2014.11); *H04N 19/132* (2014.11);
(Continued)

(58) Field of Classification Search
None
See application file for complete search history.

(56) References Cited

U.S. PATENT DOCUMENTS

2018/0192072 A1   7/2018  Chen et al.
2018/0262773 A1*  9/2018  Chuang ............... H04N 19/107
(Continued)

FOREIGN PATENT DOCUMENTS

CN    106664416 A    5/2017
CN    107925775 A    4/2018
(Continued)

OTHER PUBLICATIONS

International Search Report of PCT Application No. PCT/US2020/023027 dated Jul. 6, 2020, (2p).
(Continued)

*Primary Examiner* — Christopher Braniff
(74) *Attorney, Agent, or Firm* — Arch & Lake LLP (57) ABSTRACT

The present disclosure relate to a bit-width control method of bi-directional optical flow (BDOF) for coding a video signal. The method includes obtaining a first reference picture $I^{(0)}$ and a second reference picture $I^{(1)}$ associated with a video block, obtaining first prediction samples $I^{(0)}(i,j)$ of the video block from a reference block in the first reference picture $I^{(0)}$, obtaining second prediction samples $I^{(1)}(i,j)$ of the video block from a reference block in the second reference picture $I^{(1)}$, controlling internal bit-widths of the BDOF by deriving internal bit-widths of intermediate parameters, obtaining motion refinements for samples in the video block based on the BDOF being applied to the video block based on the first prediction samples $I^{(0)}(i,j)$ and the
(Continued)

second prediction samples $I^{(1)}(i,j)$, and obtaining bi-prediction samples of the video block based a the motion refinements.

15 Claims, 6 Drawing Sheets

Related U.S. Application Data (60) Provisional application No. 62/819,408, filed on Mar. 15, 2019.

(51) Int. Cl.
| | | |
|---|---|---|
| *H04N 19/132* | (2014.01) | |
| *H04N 19/137* | (2014.01) | |
| *H04N 19/172* | (2014.01) | |
| *H04N 19/176* | (2014.01) | |
| *H04N 19/513* | (2014.01) | |
| *H04N 19/537* | (2014.01) | |
| *H04N 19/573* | (2014.01) | |
| *H04N 19/577* | (2014.01) | |

(52) U.S. Cl.
CPC ......... *H04N 19/137* (2014.11); *H04N 19/172* (2014.11); *H04N 19/176* (2014.11); *H04N 19/521* (2014.11); *H04N 19/537* (2014.11); *H04N 19/573* (2014.11); *H04N 19/577* (2014.11)

(56) References Cited

U.S. PATENT DOCUMENTS

| | | |
|---|---|---|
| 2018/0270500 A1 | 9/2018 | Li et al. |
| 2018/0316929 A1 | 11/2018 | Li et al. |
| 2018/0376166 A1 | 12/2018 | Chuang et al. |
| 2022/0038679 A1* | 2/2022 | Xiu ..................... H04N 19/176 |

FOREIGN PATENT DOCUMENTS

| | | |
|---|---|---|
| CN | 108028929 A | 5/2018 |
| CN | 108781294 A | 11/2018 |
| WO | 2017/134957 A1 | 8/2017 |
| WO | 2018/166989 A1 | 9/2018 |
| WO | 2018169989 A1 | 9/2018 |
| WO | 2019/010156 A1 | 1/2019 |
| WO | 2019010123 A1 | 1/2019 |
| WO | 2019010156 A1 | 1/2019 |
| WO | 2020/061082 A1 | 3/2020 |
| WO | 2020142762 A1 | 7/2020 |

OTHER PUBLICATIONS

Xiu, Xiaoyu et al., "CE9-Related: Complexity Reduction and Bit-Width Control for Bi-Directional Optical Flow (BIO)", JVET-L0256, Joint Video Experts Team (JVET) of ITU-T SG 16 WP 3 and ISO/IEC JTC 1/SC 29/WG 11, 12th Meeting: Macao, CN, Sep. 25, 2018, (13p).

Kwai Inc, Xiaoyu Xiu et al., "CE9-related: Improvements on bi-directional optical flow (BDOF)", Joint Video Experts Team (JVET) of ITU-T SG 16 WP 3 and ISO/EC JTC 1/SC 29/WG 11, JVET-N0325, 14th Meeting: Geneva, CH, Mar. 19-27, 2019, (8p).

InterDigital Communications, Xiaoyu Xiu et al., "CE9-related: Complexity reduction and bit-width control for bi-directional optical flow (BIO)", Joint Video Experts Team (JVET) of ITU-T SG 16 WP 3 and ISO/EC JTC 1/SC 29/WG 11, JVET-L0256_v2, 12th Meeting: Macao, CN, Oct. 3-12, 2018, (16p).

Sharp Corporation, Takeshi Chujoh, "CE9-related: Simplification of BDOF", Joint Video Experts Team (JVET) of ITU-T SG 16 WP 3 and ISO/EC JTC 1/SC 29/WG 11, JVET-N0147-v1, 14th Meeting: Geneva, CH, Mar. 19-27, 2019, (4p).

Jianle Chen et al., "Algorithmdescription for Versatile Video Coding and Test Model 4(VTM 4)", Joint Video Experts Team (JVET) of ITU-T SG 16 WP 3 and ISO/EC JTC 1/SC 29/WG 11, JVET-MI002-vl, 13th Meeting: Marrakech, MA, Jan. 9-18, 2019, (64p).

Xiaoyu Xiu, et al., "CE9-related: Improvements on bi-directional optical flow (BDOF)," Joint Video Experts Team (JVET) of ITU-T SG 16 WP 3 and ISO/IEC JTC 1/SC 29/WG 11, JVET-N0325, 14th Meeting: Geneva, CH, Mar. 13, 2019, (pp. 1-7).

Xiaoyu Xiu, Yuwen He, and Yan Ye, "CE9-related: Complexity reduction and bit-width control for bi-directional optical low (BIO)," Joint Video Experts Team (JVET) of ITU-T SG 16 WP 3 and ISO/IEC JTC 1/SC 29/WG 11, JVET-L0256_v2, 12th Meeting: Macao, CN, Sep. 2018, (pp. 1-15).

Takeshi Chujoh and Tomohiro Ikai, "Non-CE9: An improvement of BDOF," Joint Video Experts Team (JVET) of ITU-T SG 16 WP 3 and ISO/IEC JTC 1/SC 29/WG 11, JVET-M0063-v3, 13th Meeting: Marrakech, MA, Jan. 2019, (pp. 1-3).

Chun-Chi Chen et al., "Generalized Bi-prediction Method for Future Video Coding," 2016 Picture Coding Symposium (PCS), Apr. 24, 2017, (5p).

Wanzhang Huang, "Research on side information Generation of Distribute Video Coding," Chinese Excellent Master's Thesis Electronic, Journal website, Jan. 15, 2013 with English translation, (74p).

Xiaoxing Zhuang et al., "An Image Reconstruction Algorithm for Spiral MRI Based on Spatio-Temporal Transform and Compressed Sending," Chinese Journal of Magnetic Resonance, Dec. 5, 2016, (10p).

* cited by examiner

METHODS AND DEVICES FOR BIT-WIDTH CONTROL FOR BI-DIRECTIONAL OPTICAL FLOW

CROSS-REFERENCE TO RELATED APPLICATIONS

This application is a continuation of International Application No.: PCT/US2020/023027, filed on Mar. 16, 2020, which is based upon and claims priority to Provisional Application No. 62/819,408 filed on Mar. 15, 2019, the entire disclosures of which are incorporated herein by reference in their entireties for all purposes.

TECHNICAL FIELD

This application is related to video coding and compression. More specifically, this disclosure relates to methods and apparatus for bi-directional optical flow (BDOF) method for video coding.

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate while avoiding or minimizing degradations to video quality.

SUMMARY

Examples of the present disclosure provide methods and apparatus for bit-width control for bi-directional optical flow (BDOF). According to a first aspect of the present disclosure, a bit-width control method of coding a video signal is provided. The method may include obtaining a first reference picture $I^{(0)}$ and a second reference picture $I^{(1)}$ associated with a video block. The first reference picture $I^{(0)}$ may be before a current picture and the second reference picture $I^{(1)}$ may be after the current picture in display order. The method may further include obtaining first prediction samples $I^{(0)}(i,j)$ of the video block from a reference block in the first reference picture $I^{(0)}$. The i and j variables may represent a coordinate of one sample with the current picture. The method may further include obtaining second prediction samples $I^{(1)}(i,j)$ of the video block from a reference block in the second reference picture $I^{(1)}$. The method may further include controlling internal bit-widths of the BDOF by deriving internal bit-widths of intermediate parameters. The intermediate parameters may include one or a combination of following intermediate parameters: horizontal gradient values, vertical gradient values, and sample differences between the first prediction samples $I^{(0)}(i,j)$ and the second prediction samples $I^{(1)}(i,j)$. The method may further include obtaining motion refinements for samples in the video block based on the BDOF being applied to the video block based on the first prediction samples $I^{(0)}(i,j)$ and the second prediction samples $I^{(1)}(i,j)$. And the method may further include obtaining bi-prediction samples of the video block based on the motion refinements.

According to a second aspect of the present disclosure, a bit-width control method of coding a video signal is provided. The method may include obtaining a first reference picture) $I^{(0)}$ and a second reference picture $I^{(1)}$ associated with a video block. The first reference picture $I^{(0)}$ may be before a current picture and the second reference picture $I^{(1)}$ may be after the current picture in display order the current picture in display order. The method may include obtaining first prediction samples $I^{(0)}(i,j)$ of the video block from a reference block in the first reference picture $I^{(0)}$. The i and j variables may represent a coordinate of one sample with the current picture. The method may include obtaining second prediction samples $I^{(1)}(i,j)$ of the video block from a reference block in the second reference picture $I^{(1)}$. The method may include controlling internal bit-widths of the BDOF by deriving internal bit-widths of intermediate parameters. The intermediate parameters may include one or a combination of following intermediate parameters: horizontal gradient values, vertical gradient values, and sample differences between the first prediction samples $I^{(0)}(i,j)$ and the second prediction samples $I^{(1)}(i,j)$. The method may include obtaining motion refinement for samples in the video block based on the BDOF and a local window being applied to the video block using the first prediction sample $I^{(0)}(i,j)$ and the second prediction sample $I^{(1)}(i,j)$. The local window covers the video block and the local window has a window size less than 6×6 pixels. And the method may include obtaining bi-prediction samples of the video block based on the motion refinements.

According to a third aspect of the present disclosure, a computing device is provided. The computing device may include one or more processors, a non-transitory computer-readable memory storing instructions executable by the one or more processors. The one or more processors may be configured to obtain a first reference picture $I^{(0)}$ and a second reference picture $I^{(1)}$ associated with a video block. The first reference picture $I^{(0)}$ may be before a current picture and the second reference picture $I^{(1)}$ may be after the current picture in display order. The one or more processors may be configured to obtain first prediction samples $I^{(0)}(i,j)$ of the video block from a reference block in the first reference picture $I^{(0)}$. The i and j variables may represent a coordinate of one sample with the current picture. The one or more processors may be configured to obtain second prediction samples $I^{(1)}(i,j)$ of the video block from a reference block in the second reference picture $I^{(0)}$. The one or more processors may be configured to control internal bit-widths of a bi-directional optical flow (BDOF) by deriving internal bit-widths of intermediate parameters. The intermediate parameters may comprise one or a combination of following parameters: horizontal gradient values, vertical gradient values, and sample differences between the first prediction samples $I^{(0)}(i,j)$ and the second prediction samples $I^{(1)}(i,j)$. The one or more processors may be configured to obtain motion refinements for samples in the video block based on the BDOF being applied to the video block based on the first prediction samples $I^{(0)}(i,j)$ and the second prediction samples $I^{(1)}(i,j)$. And the one or more processors may be configured to obtain bi-prediction samples of the video block based on the motion refinements.

According to a fourth aspect of the present disclosure, a computing device is provided. The computing device may include one or more processors, a non-transitory computer-readable memory storing instructions executable by the one or more processors. The one or more processors may be configured to obtain a first reference picture $I^{(0)}$ and a second reference picture $I^{(1)}$ associated with a video block. The first reference picture $I^{(0)}$ may be before a current picture and the second reference picture $I^{(1)}$ may be after the current picture in display order. The one or more processors may be configured to obtain first prediction samples $I^{(0)}(i,j)$ of the video block from a reference block in the first reference picture $I^{(0)}$. The i and j variables may represent a coordinate of one sample with the current picture. The one or more processors may be configured obtain second prediction samples $I^{(1)}(i,j)$ of the video block from a reference block in the second reference picture $I^{(1)}$. The one or more processors may be configured control internal bit-widths of a bi-directional optical flow (BDOF) by deriving internal bit-widths of intermediate parameters. The intermediate parameters may include one or a combination of following intermediate parameters: horizontal gradient values, vertical gradient values, and sample differences between the first prediction samples $I^{(0)}(i,j)$ and the second prediction samples $I^{(1)}(i,j)$. The one or more processors may be configured obtain motion refinement for samples in the video block based on the BDOF and a local window being applied to the video block using the first prediction sample $I^{(0)}(i,j)$ and the second prediction sample $I^{(1)}(i,j)$. The local window may cover the sub-block and the local window may have a window size of 6×6 pixels. And the one or more processors may be configured obtain bi-prediction samples of the video block based on the motion refinements.

It is to be understood that both the foregoing general description and the following detailed description are examples only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of the embodiments do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. One Joint Video Exploration Team (JVET) was formed in October 2015 by ITU-T VECG and ISO/IEC MPEG to begin a significant study of advanced technologies that could enable substantial enhancement of coding efficiency. One reference software called the joint exploration model (JEM) was maintained by the JVET by integrating several additional coding tools on top of the HEVC test model (HM).

In October 2017, the joint call for proposals (CfP) on video compression with capability beyond HEVC was issued by ITU-T and ISO/IEC [9]. In April 2018, 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC) [10]. In the same month, one reference software codebase, called VVC test model (VTM) [11], was established for demonstrating a reference implementation of the VVC standard.

Figure 1:
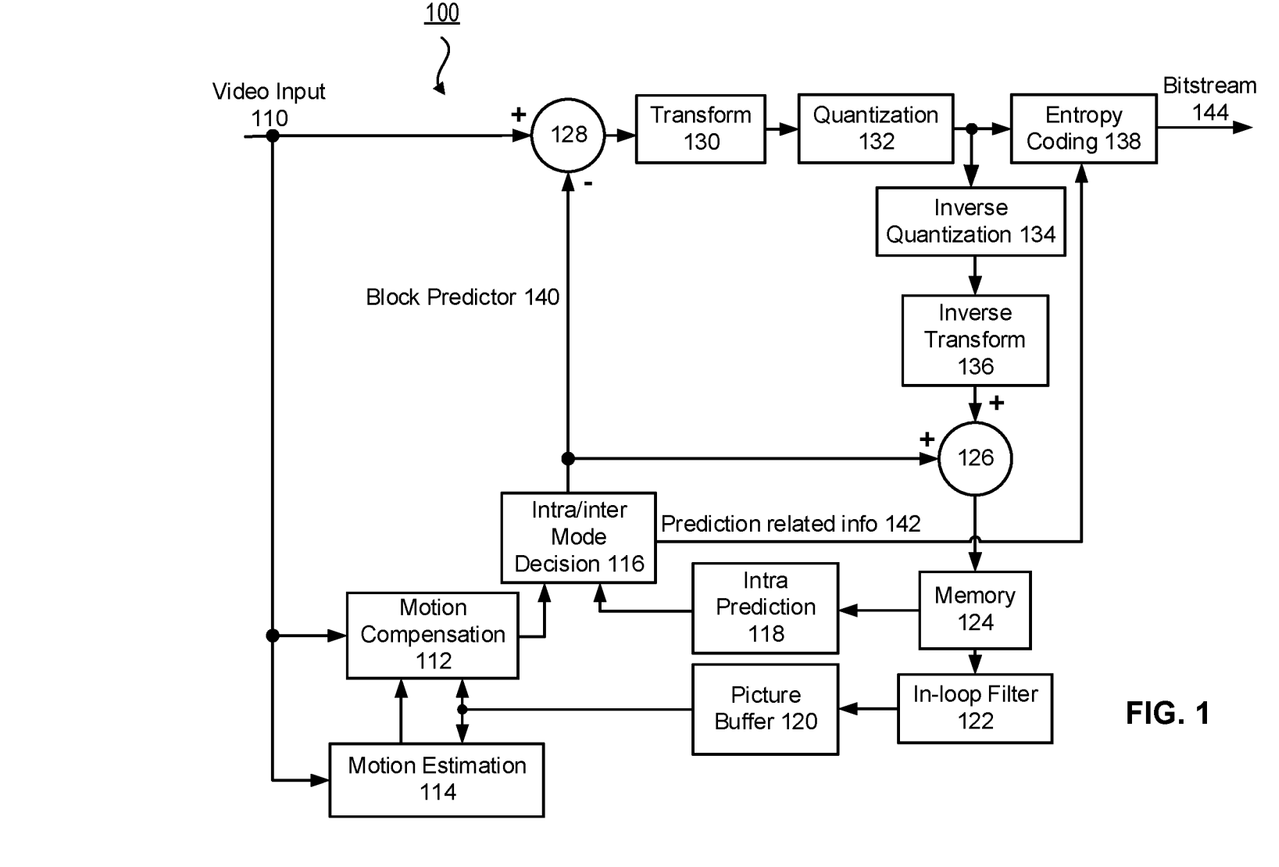
FIG. 1 is a block diagram of an encoder, according to an example of the present disclosure.

Like HEVC, the VVC is built upon the block-based hybrid video coding framework. FIG. 1 gives the block diagram of a generic block-based hybrid video encoding system. The input video signal is processed block by block (called coding units (CUs)). Specifically, FIG. 1 shows a typical encoder 100 in accordance with the present disclosure. The encoder 100 has video input 110, motion compensation 112, motion estimation 114, intra/inter mode decision 116, block predictor 140, adder 128, transform 130, quantization 132, prediction related info 142, intra prediction 118, picture buffer 120, inverse quantization 134, inverse transform 136, adder 126, memory 124, in-loop filter 122, entropy coding 138, and bitstream 144.

In VTM-1.0, a CU can be up to 128×128 pixels. However, different from the HEVC which partitions blocks only based on quad-trees, in the VVC, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure.

As shown in FIGS. 3A, 3B, 3C, 3D, and 3E (described below), there are five splitting types: quaternary partitioning, horizontal binary partitioning, vertical binary partitioning, horizontal ternary partitioning, and vertical ternary partitioning.

Figure 3A:
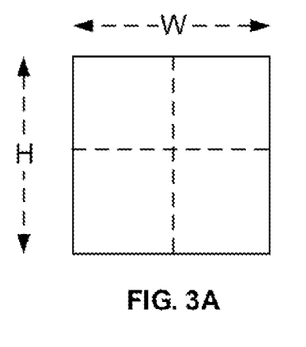
FIG. 3A is a diagram illustrating block partitions in a multi-type tree structure, according to an example of the present disclosure.

FIG. 3A shows a diagram illustrating block quaternary partition in a multi-type tree structure, in accordance with the present disclosure.

Figure 3B:
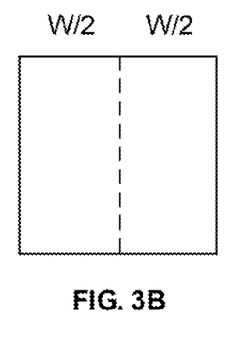
FIG. 3B is a diagram illustrating block partitions in a multi-type tree structure, according to an example of the present disclosure.

FIG. 3B shows a diagram illustrating block vertical binary partition in a multi-type tree structure, in accordance with the present disclosure.

Figure 3C:
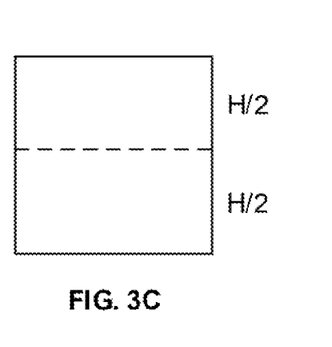
FIG. 3C is a diagram illustrating block partitions in a multi-type tree structure, according to an example of the present disclosure.

FIG. 3C shows a diagram illustrating block horizontal binary partition in a multi-type tree structure, in accordance with the present disclosure.

Figure 3D:
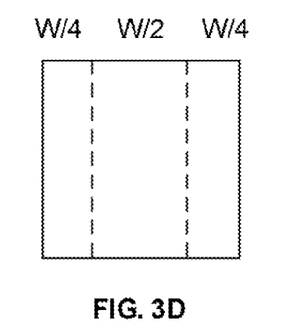
FIG. 3D is a diagram illustrating block partitions in a multi-type tree structure, according to an example of the present disclosure.

FIG. 3D shows a diagram illustrating block vertical ternary partition in a multi-type tree structure, in accordance with the present disclosure.

Figure 3E:
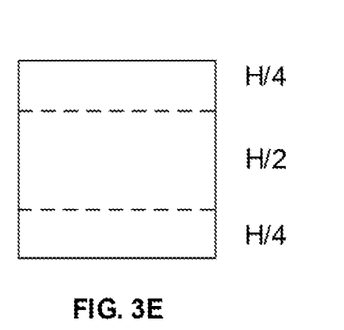
FIG. 3E is a diagram illustrating block partitions in a multi-type tree structure, according to an example of the present disclosure.

FIG. 3E shows a diagram illustrating block horizontal ternary partition in a multi-type tree structure, in accordance with the present disclosure.

In FIG. 1, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. The temporal prediction (also referred to as "inter prediction" or "motion compensated prediction") uses reconstructed pixels from the already coded video pictures to predict the current video block. The temporal prediction reduces temporal redundancy inherent in the video signal. The temporal prediction signal for a given CU is usually signaled by one or more motion vectors (MVs), which indicate the amount and the direction of motion between the current CU and its temporal reference.

Also, if multiple reference pictures are supported, one reference picture index is additionally sent, which is used to identify from which reference picture in the reference picture storage the temporal prediction signal comes from. After spatial and/or temporal prediction, the mode decision block in the encoder chooses the best prediction mode, for example, based on the rate-distortion optimization method. The prediction block is then subtracted from the current video block, and the prediction residual is de-correlated using transform and quantized.

The quantized residual coefficients are inverse quantized and inverse transformed to form the reconstructed residual, which is then added back to the prediction block to form the reconstructed signal of the CU. Further, in-loop filtering, such as deblocking filter, sample adaptive offset (SAO), and adaptive in-loop filter (ALF) may be applied on the reconstructed CU before it is put in the reference picture storage and used to code future video blocks. To form the output video bit-stream, coding mode (inter or intra), prediction mode information, motion information, and quantized residual coefficients are all sent to the entropy coding unit to be further compressed and packed to form the bit-stream.

Figure 2:
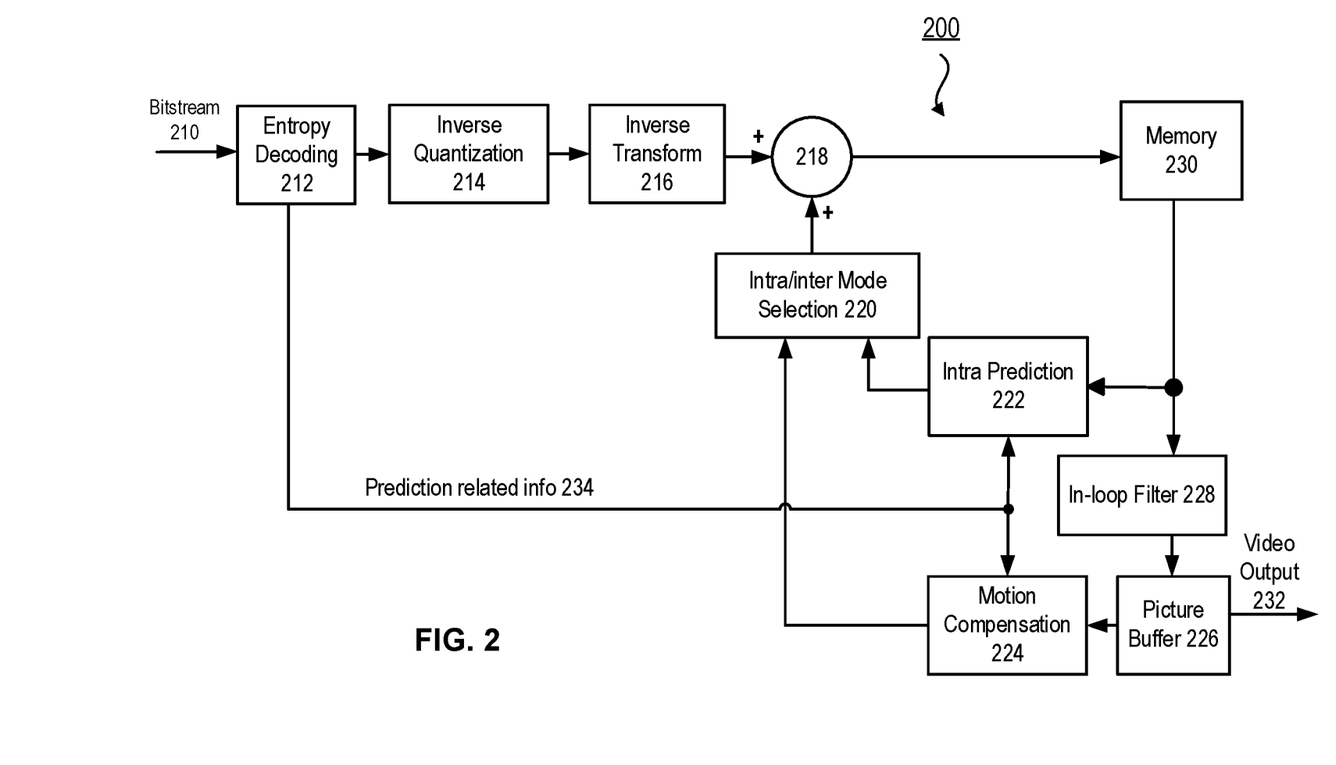
FIG. 2 is a block diagram of a decoder, according to an example of the present disclosure.

FIG. 2 gives a general block diagram of a block-based video decoder. Specifically, FIG. 2 shows a typical decoder 200 block diagram, in accordance with the present disclosure. Decoder 200 has bitstream 210, entropy decoding 212, inverse quantization 214, inverse transform 216, adder 218, intra/inter mode selection 220, intra prediction 222, memory 230, in-loop filter 228, motion compensation 224, picture buffer 226, prediction related info 234, and video output 232.

In FIG. 2, the video bit-stream is first entropy decoded at entropy decoding unit. The coding mode and prediction information are sent to either the spatial prediction unit (if intra coded) or the temporal prediction unit (if inter-coded) to form the prediction block. The residual transform coefficients are sent to the inverse quantization unit and inverse transform unit to reconstruct the residual block. The prediction block and the residual block are then added together. The reconstructed block may further go through in-loop filtering before it is stored in reference picture store. The reconstructed video in reference picture store is then sent out to drive a display device, as well as used to predict future video blocks.

Bi-Directional Optical Flow

Conventional bi-prediction in video coding is a simple combination of two temporal prediction blocks obtained from the reference pictures that are already reconstructed. However, due to the limitation of the block-based motion compensation, there could be remaining small motion that can be observed between the samples of two prediction blocks, thus reducing the efficiency of motion compensated prediction. A bi-directional optical flow (BDOF) is applied in the VVC to lower the impacts of such motion for every sample inside one block.

Figure 4:
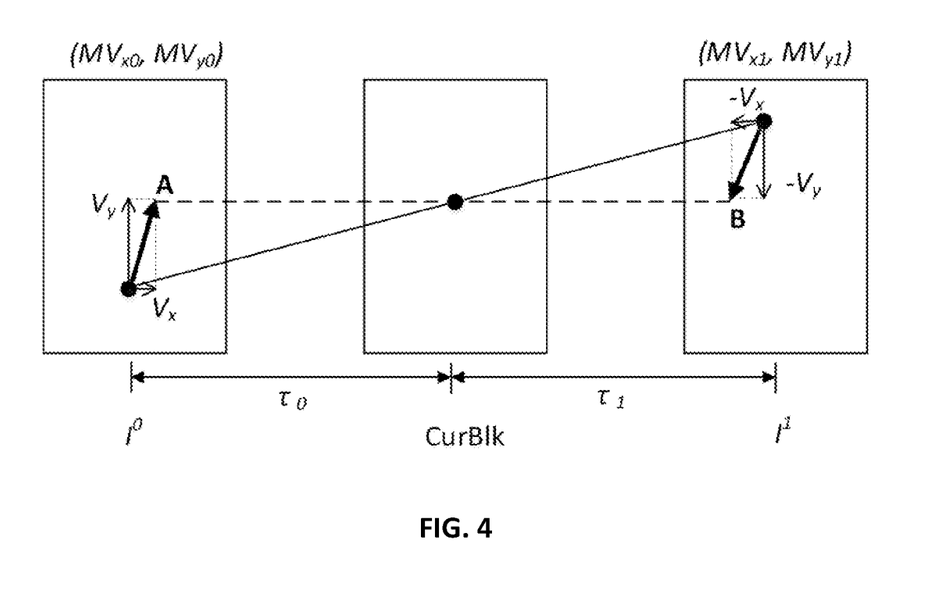
FIG. 4 is a diagram illustration of a bi-directional optical flow (BDOF) model, according to an example of the present disclosure.

FIG. 4 shows an illustration of a bi-directional optical flow (BDOF) model, in accordance with the present disclosure. The BDOF is sample-wise motion refinement that is performed on top of the block-based motion-compensated predictions when bi-prediction is used. The motion refinement $(v_x, v_y)$ of each 4×4 sub-block is calculated by minimizing the difference between L0 and L1 prediction samples after the BDOF is applied inside one 6×6 window Ω around the sub-block. Specifically, the value of $(v_x, v_y)$ is derived as $$v_x = S_1 > 0 ? clip3(-th_{BDOF}, th_{BDOF}, -((S_3 \cdot 2^3) \\ >> \lfloor \log_2 S_1 \rfloor)) : 0$$

$$v_y = S_5 > 0 ? clip3(-th_{BDOF}, th_{BDOF}, ((S_6 \cdot 2^3 - ((v_x S_{2,m}) \\ << n_{S_2} + v_x S_{2,s})/2) >> \lfloor \log_2 S_5 \rfloor)): \qquad (1)$$

where $\lfloor \cdot \rfloor$ is the floor function; clip3(min, max, x) is a function that clips a given value x inside the range of [min, max]; the symbol >> represents bitwise right shift operation;

the symbol << represents bitwise left shift operation; $th_{BDOF}$ is the motion refinement threshold to prevent the propagated errors due to irregular local motion, which is equal to $2^{13-BD}$, where BD is the bit-depth of the input video. In (1), $$S_{2,m} = S_2 >> n_{S_2}, S_{2,s} = S_2 \& (2^{n_{S_2}} - 1).$$

The values of $S_1$, $S_2$, $S_3$, $S_5$, and $S_6$ are calculated as $$S_1 = \sum_{(i,j)\in\Omega} \psi_x(i,j) \cdot \psi_x(i,j) \quad (2)$$

$$S_2 = \sum_{(i,j)\in\Omega} \psi_x(i,j) \cdot \psi_y(i,j)$$

$$S_3 = \sum_{(i,j)\in\Omega} \theta(i,j) \cdot \psi_x(i,j)$$

$$S_5 = \sum_{(i,j)\in\Omega} \psi_y(i,j) \cdot \psi_y(i,j)$$

$$S_6 = \sum_{(i,j)\in\Omega} \theta(i,j) \cdot \psi_y(i,j)$$

where $$\psi_x(i,j) = \left(\frac{\partial I^{(1)}}{\partial x}(i,j) + \frac{\partial I^{(0)}}{\partial x}(i,j)\right) >> 3 \quad (3)$$

$$\psi_y(i,j) = \left(\frac{\partial I^{(1)}}{\partial y}(i,j) + \frac{\partial I^{(0)}}{\partial y}(i,j)\right) >> 3$$

$$\theta(i,j) = (I^{(1)}(i,j) >> 6) - (I^{(0)}(i,j) >> 6)$$

where $I^{(k)}(i,j)$ are the sample value at coordinate (i,j) of the prediction signal in list k, k=0,1, which are generated at intermediate high precision (i.e., 16 bits);

$$\frac{\partial I^{(k)}}{\partial x}(i,j) \text{ and } \frac{\partial I^{(k)}}{\partial y}(i,j)$$

are the horizontal and vertical gradients of the sample that are obtained by directly calculating the difference between its two neighboring samples, i.e., $$\frac{\partial I^{(k)}}{\partial x}(i,j) = (I^{(k)}(i+1,j) - I^{(k)}(i-1,j)) >> 4 \quad (4)$$

$$\frac{\partial I^{(k)}}{\partial y}(i,j) = (I^{(k)}(i,j+1) - I^{(k)}(i,j-1)) >> 4$$

Based on the motion refinement derived in (1), the final bi-prediction samples of the CU are calculated by interpolating the L0/L1 prediction samples along the motion trajectory based on the optical flow model, as indicated by $$pred_{BDOF}(x,y) = (I^{(0)}(x,y) + I^{(1)}(x,y) + b + o_{offset}) >> shift \quad (5)$$

$$b = rnd\left(\left(v_x\left(\frac{\partial I^{(1)}(x,y)}{\partial x} - \frac{\partial I^{(0)}(x,y)}{\partial x}\right)\right)/2\right) + rnd\left(\left(v_y\left(\frac{\partial I^{(1)}(x,y)}{\partial y} - \frac{\partial I^{(0)}(x,y)}{\partial y}\right)\right)/2\right)$$

where shift and $O_{offset}$ are the right shift value and the offset value that are applied to combine the L0 and L1 prediction signals for bi-prediction, which are equal to 15−BD and 1<<(14−BD)+2·(1<<13), respectively. Table 1 illustrates the specific bit-widths of intermediate parameters that are involved in the BDOF process. Bit-widths, for example, are the number of bits necessary to represent a value. As shown in the table, the internal bit-width of the whole BDOF process does not exceed 32 bits. Additionally, the multiplication with the worst possible input happens at the product of $v_x S_{2,m}$ in (1) with 15-bit and 4-bit inputs. Therefore, a 15-bit multiplier is enough for the BDOF.

TABLE 1

The bit-widths of intermediate parameters of the BDOF in the VVC

| Operation | Parameter | Bit-width |
|---|---|---|
| L0/L1 prediction | $I^{(0)}(i,j), I^{(1)}(i,j)$ | 16 |
| Gradient derivation | $\frac{\partial I^{(0)}}{\partial x}(i,j), \frac{\partial I^{(0)}}{\partial y}(i,j)$ | 13 |
|  | $\frac{\partial I^{(1)}}{\partial x}(i,j), \frac{\partial I^{(1)}}{\partial y}(i,j)$ | 13 |
| Correlation parameter calculation | $\theta(i,j) = (I^{(1)}(i,j) >> 6) - (I^{(0)}(i,j) >> 6)$ | 11 |
|  | $\psi_x(i,j) = \left(\frac{\partial I^{(1)}}{\partial x}(i,j) + \frac{\partial I^{(0)}}{\partial x}(i,j)\right) >> 3$ | 11 |
|  | $\psi_y(i,j) = \left(\frac{\partial I^{(1)}}{\partial x}(i,j) + \frac{\partial I^{(0)}}{\partial x}(i,j)\right) >> 3$ | 11 |
|  | $\psi_x(i,j) \cdot \psi_x(i,j)$ | 21 |
|  | $\psi_x(i,j) \cdot \psi_y(i,j)$ | 21 |
|  | $\theta(i,j) \cdot \psi_x(i,j)$ | 21 |
|  | $\psi_y(i,j) \cdot \psi_y(i,j)$ | 21 |
|  | $\theta(i,j) \cdot \psi_y(i,j)$ | 21 |
| Summation | $S_1 = \sum_{(i,j)\in\Omega} \psi_x(i,j) \cdot \psi_x(i,j)$ | 27 |
|  | $S_2 = \sum_{(i,j)\in\Omega} \psi_x(i,j) \cdot \psi_y(i,j)$ | 27 |
|  | $S_3 = \sum_{(i,j)\in\Omega} \theta(i,j) \cdot \psi_x(i,j)$ | 27 |
|  | $S_5 = \sum_{(i,j)\in\Omega} \psi_y(i,j) \cdot \psi_y(i,j)$ | 27 |
|  |  | 27 |
| Motion refinement derivation | $v_x = S_1 > 0$? clip3($-th_{BIO}', th_{BIO}', -((S_3 \cdot 2^3) >> \lfloor \log_2 S_1 \rfloor)$):0 | 4 |
|  | $S_{2,m} = S_2 >> 12$ | 15 |
|  | $S_{2,s} = S_2 \& (2^{12} - 1)$ | 12 |
|  | $((v_x S_{2,m}) << 12 + v_x S_{2,s})/2$ | 30 |
|  | $S_6 \cdot 2^3 - ((v_x S_{2,m}) << 12 + v_x S_{2,s})/2$ | 31 |
|  | $v_y = S_5 > 0$? clip3($-th_{BIO}', th_{BIO}', -((S_6 \cdot 2^3 - ((v_x S_{2,m}) << 12 + v_x S_{2,s})/2) >> \lfloor \log_2 S_5 \rfloor)$):0 | 4 |
| Final bi-prediction generation | $v_x \cdot \left(\frac{\partial I^{(1)}}{\partial x}(i,j) - \frac{\partial I^{(0)}}{\partial x}(i,j)\right)$ | 17 |
|  | $v_y \cdot \left(\frac{\partial I^{(1)}}{\partial y}(i,j) - \frac{\partial I^{(0)}}{\partial y}(i,j)\right)$ | 17 |

Efficiency of Bi-Predictive Prediction

Although the BDOF can enhance the efficiency of bi-predictive prediction, its design can still be further improved. Specifically, controlling the bit-widths of intermediate parameters in the existing BDOF design in VVC is identified in this disclosure.

As shown in Table 1, the parameter $\theta(i,j)$ (i.e., the difference between L0 and L1 prediction samples), and the parameter $\psi_x(i,j)$ and $\psi_y(i,j)$ (i.e., the sum of the horizontal/vertical L0 and L1 gradient values) are represented in the same bit-width of 11 bits. Although such a method can facilitate the overall control of the internal bit-width for the BDOF, it is suboptimal with regards to the precision of the derived motion refinements. This is because as shown in (4), the gradient values are calculated as the difference between neighboring prediction samples; Due to the high-pass nature of such process, the derived gradients are less reliable in the presence of noise, e.g., the noise captured in the original video and the coding noise that is generated during the coding process. This means that it may not always be beneficial to represent the gradient values in high bit-width.

As shown in Table 1, the maximum bit-width usage of the whole BDOF process occurs with the calculation of the vertical motion refinement $v_y$, where $S_6$ (27 bits) is firstly left-shifted by 3-bit then is subtracted by $((v_x S_{2,m}) \ll 12 + v_x S_{2,s})/2$ (30 bits). Therefore, the maximum bit-width of the current design is equal to 31 bits. In a practical hardware implementation, the coding process with maximal internal bit-width more than 16-bit is usually implemented by a 32-bit implementation. Therefore, the existing design does not fully utilize the valid dynamic range of the 32-bit implementation. This may lead to unnecessary precision loss of the motion refinements derived by the BDOF.

Improving the Efficiency of Bi-Predictive Prediction Using BDOF

In this disclosure, one improved bit-width control method is proposed to address the two issues of the bit-width control method, as pointed out in the "Efficiency of bi-predictive prediction" section for the existing BDOF design.

Figure 5:
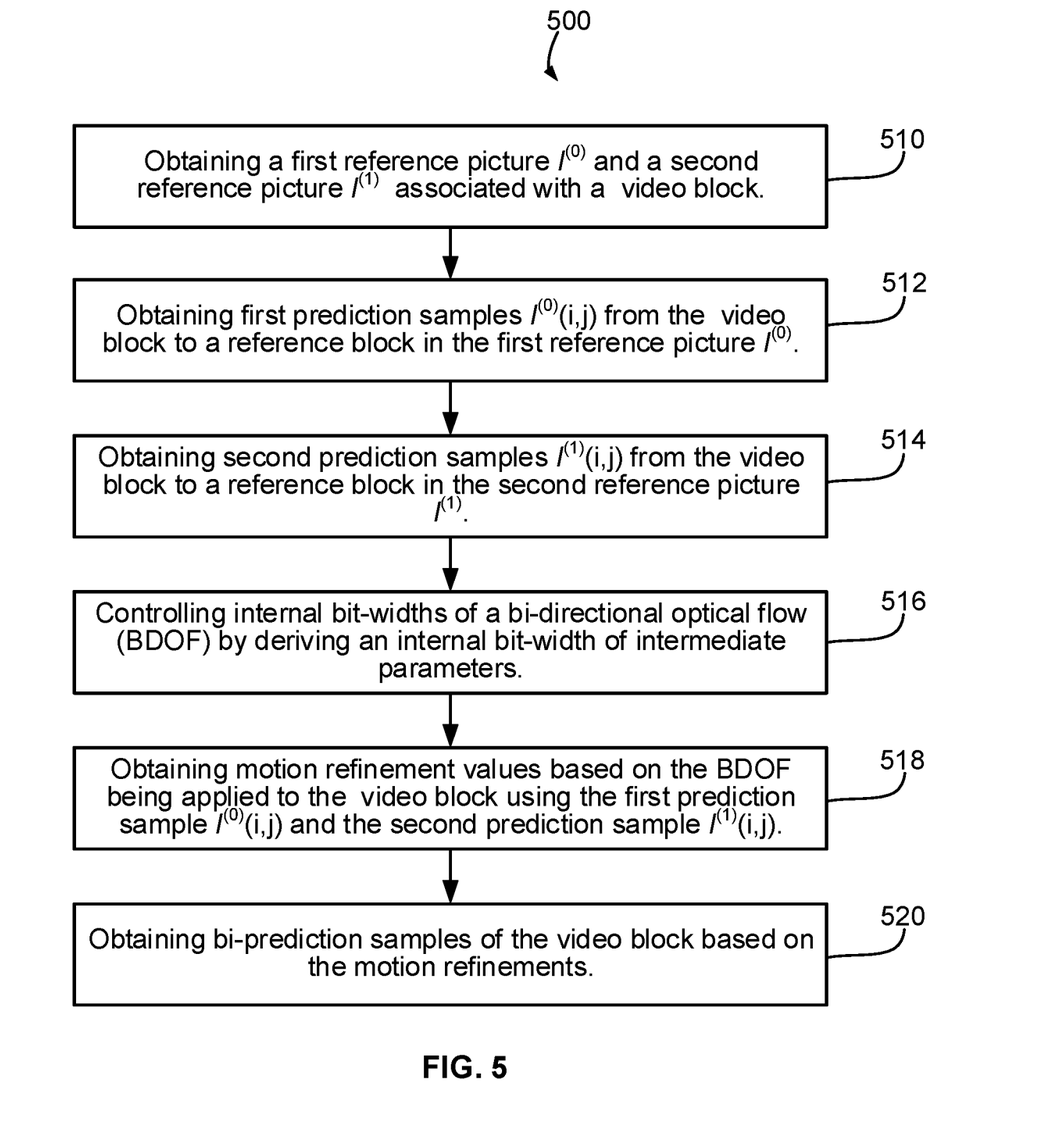
FIG. 5 is a flow chart illustrating a bit-width control method of coding a video signal, according to an example of the present disclosure.

FIG. 5 shows a bit-width control method of coding a video signal in accordance with the present disclosure.

In step 510, obtaining a first reference picture $I^{(0)}$ and a second reference picture $I^{(1)}$ associated with a sub-block. The first reference picture $I^{(0)}$ is before a current picture and the second reference picture $I^{(1)}$ is after the current picture in display order. For example, reference pictures may be video pictures neighboring the current picture being encoded.

In step 512, obtaining a first prediction sample $I^{(0)}(i,j)$ from the sub-block to a reference block in the first reference picture $I^{(0)}$. For example, the first prediction sample $I^{(0)}(i,j)$ may be a prediction sample using a motion vector in the L0 list of the previous reference picture in display order.

In step 514, obtaining a second prediction sample $I^{(1)}(i,j)$ from the sub-block to a reference block in the second reference picture $I^{(1)}$. For example, the second prediction sample $I^{(1)}(i,j)$ may be a prediction sample using a motion vector in the L1 list of the next reference picture in display order.

In step 516, controlling internal bit-widths of a bi-directional optical flow (BDOF) by changing internal bit-widths of intermediate parameters. The intermediate parameters include horizontal gradient values and vertical gradient values derived based on the first prediction sample $I^{(0)}(i,j)$ and the second prediction sample $I^{(1)}(i,j)$. The gradient values, for example, are the difference between its two neighboring prediction samples (first prediction sample $I^{(0)}(i,j)$ and the second prediction sample $I^{(1)}(i,j)$).

In step 518, obtaining motion refinement values based on the BDOF being applied to the sub-block using the first prediction sample $I^{(0)}(i,j)$ and the second prediction sample $I^{(1)}(i,j)$.

In step 520, obtaining bi-prediction samples of the sub-block based on the motion refinement values.

In an embodiment of the present disclosure, to overcome the negative impacts of gradient estimation errors, additional right shift grad are introduced in the proposed method when calculating the gradient values $$\frac{\partial I^{(k)}}{\partial x}(i, j) \text{ and } \frac{\partial I^{(k)}}{\partial y}(i, j)$$

in (4), i.e., to lower the internal bit-width of gradient values. Specifically, the horizontal and vertical gradients at each sample position are calculated as $$\frac{\partial I^{(k)}}{\partial x}(i, j) = (I^{(k)}(i+1, j) - I^{(k)}(i-1, j)) \gg (4 + n_{grad}) \quad (6)$$

$$\frac{\partial I^{(k)}}{\partial y}(i, j) = (I^{(k)}(i, j+1) - I^{(k)}(i, j-1)) \gg (4 + n_{grad})$$

Moreover, additional bit-shift $n_{adj}$ is introduced to the calculation of variables $\psi_x(i,j)$, $\psi_y(i,j)$ and $\theta(i,j)$ in order to control the entire BDOF process so that it is operated at appropriate internal bit-widths, as depicted as:

$$\psi_x(i, j) = \left(\frac{\partial I^{(1)}}{\partial x}(i, j) + \frac{\partial I^{(0)}}{\partial x}(i, j)\right) \gg (3 - n_{adj}) \quad (7)$$

$$\psi_y(i, j) = \left(\frac{\partial I^{(1)}}{\partial y}(i, j) + \frac{\partial I^{(0)}}{\partial y}(i, j)\right) \gg (3 - n_{adj})$$

$$\theta(i, j) = (I^{(1)}(i, j) \gg (6 - n_{adj})) - (I^{(0)}(i, j) \gg (6 - n_{adj}))$$

In Table 2, due to the modification to the number of right-shifted bits that are applied in (6) and (7), the dynamic ranges of the parameters $\psi_x(i,j)$, $\psi_y(i,j)$ and K0) will be different, compared to the existing BDOF design in Table 1 where the three parameters are represented in the same dynamic range (i.e., 21 bits). Such change can increase the bit-widths of the internal parameters $S_1$, $S_2$, $S_3$, $S_5$, and $S_6$, which could potentially increase the maximal bit-width of internal BDOF process to be beyond 32 bits. Thus, to ensure a 32-bit implementation, two additional clipping operations are introduced in calculating the values of $S_2$ and $S_6$. Specifically, in the proposed method, the values of the two parameters are calculated as $$S_2 = \text{Clip3}\left(-2^{B_2}, 2^{B_2} - 1, \sum_{(i,j) \in \Omega} \psi_x(i, j) \cdot \psi_y(i, j)\right) \quad (8)$$

$$S_6 = \text{Clip3}\left(-2^{B_6}, 2^{B_6} - 1, \sum_{(i,j) \in \Omega} \theta(i, j) \cdot \psi_y(i, j)\right)$$

where $B_2$ and $B_6$ are the parameters to control the output dynamic ranges of $S_2$ and $S_6$, respectively. For example, a bit-depth represents the number of bits used to define each pixel. It should be noted that different from the gradient calculation, the clipping operations in (8) are only applied once to calculate the motion refinement of each 4×4 sub-block inside one BDOF CU, i.e., being invoked based on the 4×4 unit. Therefore, the corresponding complexity increase due to the clipping operations introduced in the proposed method is very negligible.

In practice, different values of $n_{grad}$, $n_{adj}$, $B_2$, and $B_6$ may be applied to achieve different trade-offs between the intermediate bit-width and the precision of internal BDOF derivations. As one embodiment of the disclosure, it is proposed to set $n_{grad}$ and $n_{adj}$ to 2, $B_2$ to 25, and $B_6$ to 27. As one embodiment of the disclosure, it is proposed to set $B_2$ to 26 and $B_6$ to 28. As one embodiment of the disclosure, it is proposed to set $n_{grad}$ and $n_{adj}$ to 6, 1, or 4.

Table 2 illustrates the corresponding bit-width of each intermediate parameter when the proposed bit-width control method is applied to the BDOF. In Table 2, bold highlights the changes that are applied in the proposed bit-width control method compared to the existing BDOF design in VVC (as shown in Table 1). As can be seen in Table 2, with the proposed bit-width control method, the internal bit-width of the whole BDOF process does not exceed 32-bits. Additionally, by the proposed design, the maximal bit-width is just 32-bits, which can fully utilize the available dynamic range of 32-bit hardware implementation. On the other hand, as shown in the table, the multiplication with the worst possible input happens at the product of $v_x S_{2,m}$ where the input $S_{2,m}$ is 14 bits and the input $v_x$ is 6 bits. Therefore, like the existing BDOF design, one 16-bit multiplier is also large enough when the proposed method is applied.

TABLE 2

The bit-widths of intermediate parameters of the proposed method

| Operation | Parameter | Bit-width |
|---|---|---|
| L0/L1 prediction | $I^{(0)}(i, j), I^{(1)}(i, j)$ | 16 |
| Gradient derivation | $\frac{\partial I^{(0)}}{\partial x}(i, j), \frac{\partial I^{(0)}}{\partial y}(i, j),$ | 11 |
| | $\frac{\partial I^{(1)}}{\partial x}(i, j), \frac{\partial I^{(1)}}{\partial y}(i, j),$ | 11 |
| Correlation parameter calculation | $\theta(i, j) = (I^{(1)}(i, j) \gg 4) - (I^{(0)}(i, j) \gg 4)$ | 13 |
| | $\psi_x(i, j) = \left(\frac{\partial I^{(1)}}{\partial x}(i, j) + \frac{\partial I^{(0)}}{\partial x}(i, j)\right) \gg 1$ | 11 |
| | $\psi_y(i, j) = \left(\frac{\partial I^{(1)}}{\partial y}(i, j) + \frac{\partial I^{(0)}}{\partial y}(i, j)\right) \gg 1$ | 11 |
| | $\psi_x(i, j) \cdot \psi_x(i, j)$ | 21 |
| | $\psi_x(i, j) \cdot \psi_y(i, j)$ | 21 |
| | $\theta(i, j) \cdot \psi_x(i, j)$ | 23 |
| | $\psi_y(i, j) \cdot \psi_y(i, j)$ | 21 |
| | $\theta(i, j) \cdot \psi_y(i, j)$ | 23 |
| Summation | $S_1 = \sum_{(i,j) \in \Omega} \psi_x(i, j) \cdot \psi_x(i, j)$ | 27 |
| | $S_2 = Clip3\left(-2^{25}, 2^{25} - 1, \sum_{(i,j) \in \Omega} \psi_x(i, j) \cdot \psi_y(i, j)\right)$ | 26 |
| | $S_3 = \sum_{(i,j) \in \Omega} \theta(i, j) \cdot \psi_x(i, j)$ | 29 |
| | $S_5 = \sum_{(i,j) \in \Omega} \psi_y(i, j) \cdot \psi_y(i, j)$ | 27 |
| | $S_6 = Clip3\left(-2^{27}, 2^{27} - 1, S_3 = \sum_{(i,j) \in \Omega} \theta(i, j) \cdot \psi_y(i, j)\right)$ | 28 |
| Motion refinement derivation | $v_x = S_1 > 0?\ clip3\ (-th_{BDOF}', th_{BDOF}', -((S_3 \cdot 2^3) \gg \lfloor \log_2 S_1 \rfloor)) : 0$ | 6 |
| | $S_{2,m} = S_2 \gg 12$ | 14 |
| | $S_{2,s} = S_2 \& (2^{12} - 1)$ | 12 |
| | $((v_x S_{2,m}) \ll 12 + v_x S_{2,s})/2$ | 31 |
| | $S_6 \cdot 2^3 - ((v_2 S_{2,m}) \ll 12 + v_x S_{2,s})/2$ | 32 |
| | $v_y = S_5 > 0?\ clip3\ (-th_{BDOF}', th_{BDOF}', - ((S_6 \cdot 2^3 - ((v_x S_{2,m}) \ll 12 + v_x S_{2,s})/2) \gg \lfloor \log_2 S_5 \rfloor)) : 0$ | 6 |
| Final bi-prediction generation | $v_x \cdot \left(\frac{\partial I^{(1)}}{\partial x}(i, j) - \frac{\partial I^{(0)}}{\partial x}(i, j)\right)$ | 17 |
| | $v_y \cdot \left(\frac{\partial I^{(1)}}{\partial y}(i, j) - \frac{\partial I^{(0)}}{\partial y}(i, j)\right)$ | 17 |

In the above method, the clipping operations, as shown in equation (8), are added to avoid the overflow of the intermediate parameter when deriving $v_x$ and $v_y$. However, such clippings are only needed when the correlation parameters are accumulated in the large local window. When one small window is applied, the overflow may not be possible. Therefore, in another embodiment of the present disclosure, the following bit-depth control method is proposed for the BDOF method without clipping, as described as follows.

First, the gradient values $$\frac{\partial I^{(k)}}{\partial x}(i, j) \text{ and } \frac{\partial I^{(k)}}{\partial y}(i, j)$$

in (4) at each sample position are calculated as $$\frac{\partial I^{(k)}}{\partial x}(i, j) = (I^{(k)}(i+1, j) - I^{(k)}(i-1, j)) \gg 6 \quad (9)$$

$$\frac{\partial I^{(k)}}{\partial y}(i, j) = (I^{(k)}(i, j+1) - I^{(k)}(i, j-1)) \gg 6$$

Second, then the correlation parameters $\psi_x(i,j)$, $\psi_y(i,j)$ and $\theta(i,j)$ used for the BDOF process are calculated as:

$$\psi_x(i, j) = \left(\frac{\partial I^{(1)}}{\partial x}(i, j) + \frac{\partial I^{(0)}}{\partial x}(i, j)\right) \gg 1 \quad (10)$$

$$\psi_y(i, j) = \left(\frac{\partial I^{(1)}}{\partial y}(i, j) + \frac{\partial I^{(0)}}{\partial y}(i, j)\right) \gg 1$$

$$\theta(i, j) = (I^{(1)}(i, j) \gg 4) - (J^{(0)}(i, j) \gg 4)$$

Third, the values of $S_1, S_2, S_3, S_5$ and $S_6$ are calculated as $$S_1 = \sum_{(i,j)\in\Omega} \psi_x(i,j)\cdot\psi_x(i,j), \quad (11)$$

$$S_3 = \sum_{(i,j)\in\Omega} \theta(i,j)\cdot\psi_x(i,j)$$

$$S_2 = \sum_{(i,j)\in\Omega} \psi_x(i,j)\cdot\psi_y(i,j)$$

$$S_5 = \sum_{(i,j)\in\Omega} \psi_y(i,j)\cdot\psi_y(i,j)$$

$$S_6 = \sum_{(i,j)\in\Omega} \theta(i,j)\cdot\psi_y(i,j)$$

Fourth, the motion refinement $(v_x, v_y)$ of each 4×4 sub-block is derived as $v_x = S_1 > 0?\text{clip3}(-th_{BDOF}, th_{BDOF},((S_3\cdot 2^3)$
$\quad >> \lfloor\log_2 S_1\rfloor)):0$ $v_y = S_5 > 0?\text{clip3}(-th_{BDOF}, th_{BDOF}, -((S_6\cdot 2^3 -$
$\quad ((v_x S_{2,m}) << n_{S_2} + v_x S_{2,s}) >> \lfloor\log_2 S_5\rfloor)): \quad (12)$ Fifth, the final bi-prediction samples of the CU are calculated by interpolating the L0/L1 prediction samples along the motion trajectory based on the optical flow model, as indicated by $$\text{pred}_{BDOF}(x,y) = (I^{(0)}(x,y) + I^{(1)}(x,y) + b + o_{\text{offset}}) \gg \text{shift} \quad (13)$$

$$b = \text{rnd}\left(\left(v_x\left(\frac{\partial I^{(1)}(x,y)}{\partial x} - \frac{\partial I^{(0)}(x,y)}{\partial x}\right)\right)/2\right) +$$

$$\text{rnd}\left(\left(v_y\left(\frac{\partial I^{(1)}(x,y)}{\partial y} - \frac{\partial I^{(0)}(x,y)}{\partial y}\right)\right)/2\right)$$

Figure 6:
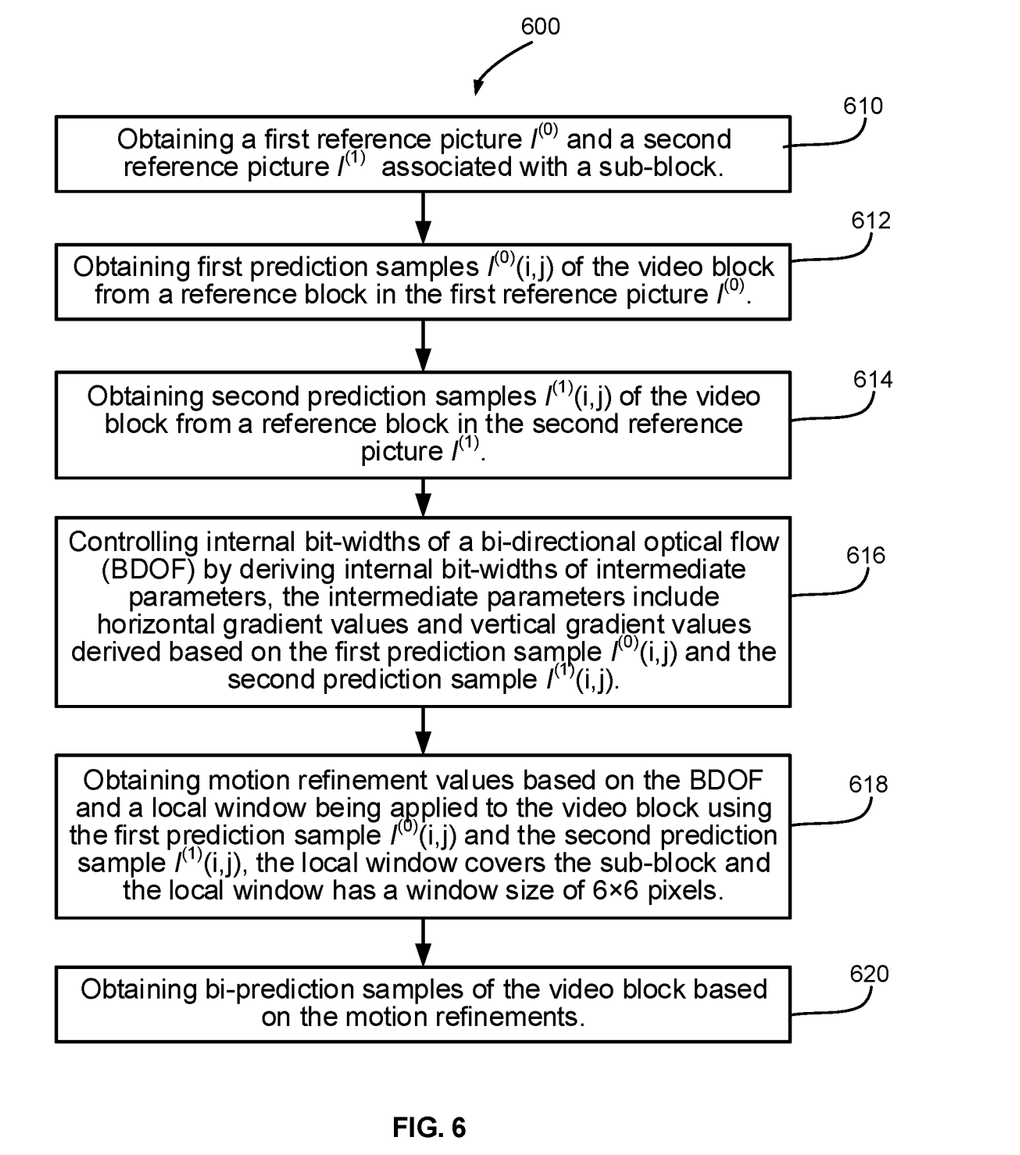
FIG. 6 is a flow chart illustrating a BDOF bit-width control method, according to an example of the present disclosure.

FIG. 6 shows an example BDOF bit-width control method in accordance with the present disclosure.

In step 610, obtaining a first reference picture $I^{(0)}$ and a second reference picture $I^{(1)}$ associated with a sub-block. The first reference picture $I^{(0)}$ is before a current picture and the second reference picture $I^{(1)}$ is after the current picture in display order.

In step 612, obtaining a first prediction sample $I^{(0)}(i,j)$ from the sub-block to a reference block in the first reference picture $I^{(0)}$.

In step 614, obtaining a second prediction sample $I^{(1)}(i,j)$ from the sub-block to a reference block in the second reference picture $I^{(1)}$.

In step 616, controlling internal bit-widths of a bi-directional optical flow (BDOF) by changing internal bit-widths of derived gradient values. The intermediate parameters includes horizontal gradient values and vertical gradient values derived based on the first prediction sample $I^{(0)}(i,j)$ and the second prediction sample $I^{(1)}(i,j)$.

In step 618, obtaining motion refinement values based on the BDOF and a local window being applied to the sub-block using the first prediction sample $I^{(0)}(i,j)$ and the second prediction sample $I^{(1)}(i,j)$. The local window covers the sub-block and the local window has a window size less than 6×6 pixels.

In step 620, obtaining bi-prediction samples of the sub-block based on the motion refinement values.

The disclosure herein further provides a bit-width control method of bi-directional optical flow (BDOF) for decoding a video signal may comprise: obtaining a first reference picture and a second reference picture associated with a video sub-block, wherein the first reference picture is before a current picture and the second reference picture is after the current picture in a display order; obtaining first prediction samples $I^{(0)}$ for samples in the video sub-block from the first reference picture; obtaining second prediction samples $I^{(1)}$ for the samples in the video sub-block from the second reference picture; obtaining motion refinements for the samples in the video sub-block by controlling bit-widths of intermediate parameters, wherein the intermediate parameters comprise at least one of horizontal gradients, vertical gradients, and sample differences based on the first prediction samples $I^{(0)}$ and the second prediction samples $I^{(1)}$; and obtaining bi-prediction samples for the samples in the video sub-block based on the motion refinements. For example, the intermediate parameters may include one or a combination of following parameters: horizontal gradients, vertical gradients, and sample differences based on the first prediction samples $I^{(0)}$ and the second prediction samples $I^{(1)}$.

In an embodiment, the controlling the bit-widths of the intermediate parameters may comprise reducing the bit-width of the intermediate parameters.

In an embodiment, the obtaining the motion refinements for the samples in the video sub-block by controlling bit-widths of intermediate parameters may comprise, for one sample in the video sub-block: obtaining a first horizontal gradient for said one sample based on a first prediction sample $I^{(0)}(i+1,j)$ and a first prediction sample $I^{(0)}(i-1,j)$, wherein i and j correspond to coordinates of the one sample; obtaining a second horizontal gradient for said one sample based on a second prediction sample $I^{(1)}(i+1,j)$ and a second prediction sample $I^{(1)}(i-1,j)$; obtaining a first vertical gradient for said one sample based on a first prediction sample $I^{(0)}(i,j+1)$ and a first prediction sample $I^{(0)}(i,j-1)$; and obtaining a second vertical gradient for said one sample based on a second prediction sample $I^{(1)}(i,j+1)$ and a second prediction sample $I^{(1)}(i,j-1)$.

In an embodiment, the obtaining the motion refinements for the samples in the video sub-block by controlling bit-widths of intermediate parameters may comprise: right shifting the first and second horizontal gradients by a first bit-shift value; and right shifting the first and second vertical gradients by the first bit-shift value.

In an embodiment, the obtaining the motion refinements for the samples in the video sub-block by controlling the bit-widths of the intermediate parameters may comprise, for one sample in the video sub-block: obtaining a first correlation value, wherein the first correlation value is a sum of horizontal gradients of the first prediction samples $I^{(0)}$ and the second prediction samples $I^{(1)}$ with respect to said one sample; obtaining a second correlation value, wherein the second correlation value is a sum of vertical gradients of the first prediction samples $I^{(0)}$ and the second prediction samples $I^{(1)}$ with respect to said one sample; obtaining a modified first correlation value by right shifting the first correlation value using a second bit-shift value; and obtaining a modified second correlation value by right shifting the second correlation value using a second bit-shift value.

In an embodiment, the obtaining the motion refinements for the samples in the video sub-block by controlling the bit-widths of the intermediate parameters may comprise, for the one sample in the video sub-block: obtaining a first modified prediction sample by right shifting a first prediction sample $I^{(0)}(i,j)$ for said one sample using a third bit-shift value; obtaining a second modified prediction sample by right shifting a second prediction sample $I^{(1)}(i,j)$ for said one sample using the third bit-shift value; and obtaining a sample difference for said one sample, wherein the sample difference is a difference between the first modified prediction sample and the second modified prediction sample.

In an embodiment, the second bit-shift value and the third bit-shift value may equal to one and four, respectively.

In an embodiment, the method may comprise: obtaining a first internal summation value based on the sum of the first correlation values and the second correlation values within each 4×4 sub-block of the video block; clipping the first internal summation value based on a first parameter, wherein the first parameter controls an output bit-depth of the first internal summation value; obtaining a second internal summation value based on the sum of the second correlation values and the third correlation values within each 4×4 sub-block of the video block; and clipping the second internal summation value based on a second parameter, wherein the second parameter controls an output bit-depth of the second internal summation value.

In an embodiment, the first parameter may equal to 26 and the second parameter is equal to 28.

The disclosure herein further provides a corresponding bit-width control method of bi-directional optical flow (BDOF) for encoding a video signal, the steps or operations of which are similar and corresponding to those for the above bit-width control method of bi-directional optical flow (BDOF) for decoding a video signal. Such steps or operations can be reached by the skilled in the art directly and without any doubts, by combining the whole description above. Therefore, the descriptions for the steps or operations for the encoding are incorporated herein inherently, without further redundant descriptions for conciseness.

Figure 7:
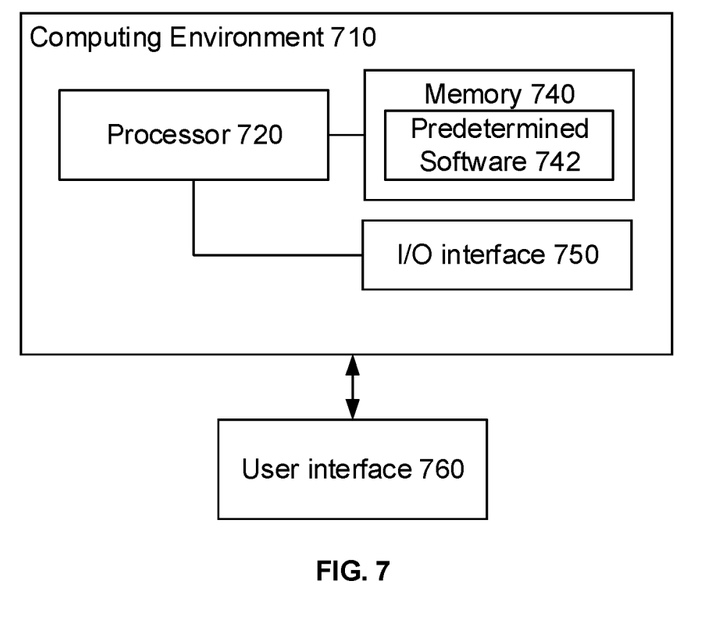
FIG. 7 is a diagram illustrating a computing environment coupled with a user interface, according to an example of the present disclosure.

FIG. 7 shows a computing environment 710 coupled with a user interface 760. The computing environment 710 can be part of the data processing server. The computing environment 710 includes processor 720, memory 740, and I/O interface 750.

The processor 720 typically controls overall operations of the computing environment 710, such as the operations associated with the display, data acquisition, data communications, and image processing. The processor 720 may include one or more processors to execute instructions to perform all or some of the steps in the above-described methods. Moreover, the processor 720 may include one or more modules that facilitate the interaction between the processor 720 and other components. The processor may be a Central Processing Unit (CPU), a microprocessor, a single chip machine, a GPU, or the like.

The memory 740 is configured to store various types of data to support the operation of the computing environment 710. Examples of such data comprise instructions for any applications or methods operated on the computing environment 710, video datasets, image data, etc. The memory 740 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 750 provides an interface between the processor 720 and peripheral interface modules, such as a keyboard, a click wheel, buttons, and the like. The buttons may include but are not limited to, a home button, a start scan button, and a stop scan button. The I/O interface 750 can be coupled with an encoder and decoder.

An exemplary computing device is provided. the computing device may comprise: one or more processors; and a memory with instructions for decoding a video signal stored thereon, the instructions, upon execution by the one or more processor, causing the computing device to: obtain a first reference picture and a second reference picture associated with a video sub-block, wherein the first reference picture is before a current picture and the second reference picture is after the current picture in a display order; obtain first prediction samples $I^{(0)}$ for samples in the video sub-block from the first reference picture; obtain second prediction samples $I^{(1)}$ for the samples in the video sub-block from the second reference picture; obtain motion refinements for the samples in the video sub-block by controlling bit-widths of intermediate parameters, wherein the intermediate parameters comprise at least one of horizontal gradients, vertical gradients, and sample differences based on the first prediction samples $I^{(0)}$ and the second prediction samples $I^{(1)}$; and obtain bi-prediction samples for the samples in the video sub-block based on the motion refinements.

In an embodiment, the instructions, upon execution by the one or more processor, may cause the computing device to control the bit-widths of the intermediate parameters by reducing the bit-width of the intermediate parameters.

In an embodiment, the instructions, upon execution by the one or more processor, may cause the computing device to obtain the motion refinements for the samples in the video sub-block by, for one sample in the video sub-block: obtaining a first horizontal gradient for said one sample based on a first prediction sample $I^{(0)}(i+1, j)$ and a first prediction sample $I^{(0)}(i-1,j)$, wherein i and j correspond to coordinates of the one sample; obtaining a second horizontal gradient for said one sample based on a second prediction sample $I^{(1)}(i+1,j)$ and a second prediction sample $I^{(1)}(i-1,j)$; obtaining a first vertical gradient for said one sample based on a first prediction sample $I^{(0)}(i,j+1)$ and a first prediction sample $I^{(0)}(i,j-1)$; and obtaining a second vertical gradient for said one sample based on a second prediction sample $I^{(1)}(i,j+1)$ and a second prediction sample $I^{(1)}(i,j-1)$.

In an embodiment, the instructions, upon execution by the one or more processor, may cause the computing device to obtain the motion refinements for the samples in the video sub-block by: right-shifting the first and second horizontal gradients by a first bit-shift value; and right-shifting the first and second vertical gradients by the first bit-shift value.

In an embodiment, the instructions, upon execution by the one or more processor, may cause the computing device to obtain the motion refinements for the samples in the video sub-block by, for one sample in the video sub-block: obtaining a first correlation value, wherein the first correlation value is a sum of horizontal gradients of the first prediction samples $I^{(0)}$ and the second prediction samples $I^{(1)}$ with respect to said one sample; obtaining a second correlation value, wherein the second correlation value is a sum of vertical gradients of the first prediction samples $I^{(0)}$ and the second prediction samples $I^{(1)}$ with respect to said one sample; obtaining a modified first correlation value by right shifting the first correlation value using a second bit-shift value; and obtaining a modified second correlation value by right shifting the second correlation value using a second bit-shift value.

In an embodiment, the instructions, upon execution by the one or more processor, may cause the computing device to obtain the motion refinements for the samples in the video sub-block by, for the one sample in the video sub-block: obtaining a first modified prediction sample by right shifting a first prediction sample $I^{(0)}(i,j)$ for said one sample using a third bit-shift value; obtaining a second modified prediction sample by right shifting a second prediction sample $I^{(1)}(i,j)$ for said one sample using the third bit-shift value; and obtaining a sample difference for said one sample, wherein the sample difference is a difference between the first modified prediction sample and the second modified prediction sample.

In an embodiment, the second bit-shift value and the third bit-shift value may equal to one and four, respectively.

In an embodiment, the instructions, upon execution by the one or more processor, may cause the computing device to: obtain a first internal summation value based on the sum of the first correlation values and the second correlation values within each 4×4 sub-block of the video block; clip the first internal summation value based on a first parameter, wherein the first parameter controls an output bit-depth of the first internal summation value; obtain a second internal summation value based on the sum of the second correlation values and the third correlation values within each 4×4 sub-block of the video block; and clip the second internal summation value based on a second parameter, wherein the second parameter controls an output bit-depth of the second internal summation value.

In an embodiment, the first parameter is equal to 26 and the second parameter is equal to 28.

The disclosure herein further provides an computing device, which may comprise: one or more processors; and a memory with instructions for encoding a video signal stored thereon, the instructions, upon execution by the one or more processor, cause the computing device to perform similar and corresponding steps or operations to those for the instructions for decoding a video signal described above. Such steps or operations can be reached by the skilled in the art directly and without any doubts, by combining the whole description above. Therefore, the descriptions for the steps or operations for the encoding are incorporated herein inherently, without further redundant descriptions for conciseness.

In an embodiment, there is also provided a non-transitory computer-readable storage medium comprising a plurality of programs, such as comprised in the memory 740, executable by the processor 720 in the computing environment 710, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, wherein the plurality of programs, when executed by the one or more processors, cause the computing device to perform the above-described method for bit-width control for BDOF.

In an embodiment, the computing environment 710 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

An exemplary non-transitory computer-readable storage medium storing instructions for decoding a video signal, the instructions, upon execution by a processor, causing the processor to: obtain a first reference picture and a second reference picture associated with a video sub-block, wherein the first reference picture is before a current picture and the second reference picture is after the current picture in a display order; obtain first prediction samples $I^{(0)}$ for samples in the video sub-block from the first reference picture; obtain second prediction samples $I^{(1)}$ for the samples in the video sub-block from the second reference picture; obtain motion refinements for the samples in the video sub-block by controlling bit-widths of intermediate parameters, wherein the intermediate parameters comprise at least one of horizontal gradients, vertical gradients, and sample differences based on the first prediction samples $I^{(0)}$ and the second prediction samples $I^{(1)}$; and obtain bi-prediction samples for the samples in the video sub-block based on the motion refinements.

In an embodiment, the instructions, upon execution by a processor, may cause the processor to control the bit-widths of the intermediate parameters by reducing the bit-width of the intermediate parameters.

The disclosure herein further provides non-transitory computer-readable storage medium storing instructions for encoding a video signal, the instructions, upon execution by the one or more processor, cause the computing device to perform similar and corresponding steps or operations to those for the instructions for decoding a video signal described above. Such steps or operations can be reached by the skilled in the art directly and without any doubts, by combining the whole description above. Therefore, the descriptions for the steps or operations for the encoding are incorporated herein inherently, without further redundant descriptions for conciseness.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact examples described above and illustrated in the accompanying drawings, and that various modifications and changes can be made without departing from the scope thereof. It is intended that the scope of the invention only be limited by the appended claims.

where shift and $O_{offset}$ are the right shift value and the offset value that are applied to combine the L0 and L1 prediction signals for bi-prediction, which are equal to 15−BD and 1<<(14−BD)+2 (1<<13), respectively. Table 1 illustrates the specific bit-widths of intermediate parameters that are involved in the BDOF process. Bit-widths, for example, are the number of bits necessary to represent a value. As shown in the table, the internal bit-width of the whole BDOF process does not exceed 32 bits. Additionally, the multiplication with the worst possible input happens at the product of $v_x S_{2,m}$ in (1) with 15-bit and 4-bit inputs. Therefore, a 15-bit multiplier is enough for the BDOF.

Efficiency of Bi-Predictive Prediction

Although the BDOF can enhance the efficiency of bi-predictive prediction, its design can still be further improved. Specifically, controlling the bit-widths of intermediate parameters in the existing BDOF design in VVC is identified in this disclosure.

As shown in Table 1, the parameter $\theta(i,j)$ (i.e., the difference between L0 and L1 prediction samples), and the parameter $\psi_x(i,j)$ and $\psi_y(i,j)$ (i.e., the sum of the horizontal/vertical L0 and L1 gradient values) are represented in the same bit-width of 11 bits. Although such a method can facilitate the overall control of the internal bit-width for

What is claimed is:

1. A bit-width control method of bi-directional optical flow (BDOF) for decoding a video signal comprising:
   obtaining a first reference picture and a second reference picture associated with a video sub-block, wherein the first reference picture is before a current picture and the second reference picture is after the current picture in a display order;
   obtaining first prediction samples $I^{(0)}$ for samples in the video sub-block from the first reference picture;
   obtaining second prediction samples $I^{(1)}$ for the samples in the video sub-block from the second reference picture;
   obtaining motion refinements for the samples in the video sub-block by controlling bit-widths of intermediate parameters, wherein the intermediate parameters comprise one or a combination of following parameters: horizontal gradients, vertical gradients, and sample differences based on the first prediction samples $I^{(0)}$ and the second prediction samples $I^{(1)}$; and
   obtaining bi-prediction samples for the samples in the video sub-block based on the motion refinements,
   wherein the controlling the bit-widths of the intermediate parameters comprises reducing the bit-widths of the horizontal gradients and the vertical gradients by a first bit-shift value, the first bit-shift value being greater than 4.

2. The method of claim 1, wherein the obtaining the motion refinements for the samples in the video sub-block by controlling bit-widths of intermediate parameters comprises, for one sample in the video sub-block:
   obtaining a first horizontal gradient for said one sample based on a first prediction sample $I^{(0)}(i+1,j)$ and a first prediction sample $I^{(0)}(i-1,j)$, wherein i and j correspond to coordinates of the one sample;
   obtaining a second horizontal gradient for said one sample based on a second prediction sample $I^{(1)}(i+1,j)$ and a second prediction sample $I^{(1)}(i-1,j)$;
   obtaining a first vertical gradient for said one sample based on a first prediction sample $I^{(0)}(i,j+1)$ and a first prediction sample $I^{(0)}(i,j-1)$; and
   obtaining a second vertical gradient for said one sample based on a second prediction sample $I^{(1)}(i,j+1)$ and a second prediction sample $I^{(1)}(i,j-1)$.

3. The method of claim 1, wherein the obtaining the motion refinements for the samples in the video sub-block by controlling the bit-widths of the intermediate parameters further comprises, for one sample in the video sub-block:
   obtaining a first correlation value, wherein the first correlation value is a sum of horizontal gradients of the first prediction samples $I^{(0)}$ and the second prediction samples $I^{(1)}$ with respect to said one sample;
   obtaining a second correlation value, wherein the second correlation value is a sum of vertical gradients of the first prediction samples $I^{(0)}$ and the second prediction samples $I^{(1)}$ with respect to said one sample;
   obtaining a modified first correlation value by right shifting the first correlation value using a second bit-shift value; and
   obtaining a modified second correlation value by right shifting the second correlation value using a second bit-shift value.

4. The method of claim 3, wherein the obtaining the motion refinements for the samples in the video sub-block by controlling the bit-widths of the intermediate parameters further comprises, for the one sample in the video sub-block:
   obtaining a first modified prediction sample by right shifting a first prediction sample $I^{(0)}(i,j)$ for said one sample using a third bit-shift value;
   obtaining a second modified prediction sample by right shifting a second prediction sample $I^{(1)}(i,j)$ for said one sample using the third bit-shift value; and
   obtaining a sample difference for said one sample, wherein the sample difference is a difference between the first modified prediction sample and the second modified prediction sample.

5. The method of claim 4, wherein the second bit-shift value and the third bit-shift value are equal to one and four, respectively.

6. The method of claim 4, further comprising:
   obtaining a first internal summation value based on the sum of the first correlation values and the second correlation values within each 4×4 sub-block of the video block;
   clipping the first internal summation value based on a first parameter, wherein the first parameter controls an output bit-depth of the first internal summation value;
   obtaining a second internal summation value based on the sum of the second correlation values and the third correlation values within each 4×4 sub-block of the video block; and
   clipping the second internal summation value based on a second parameter, wherein the second parameter controls an output bit-depth of the second internal summation value.

7. The method of claim 6, wherein the first parameter is equal to 26 and the second parameter is equal to 28.

8. A computing device comprising:
   one or more processors; and
   a memory with instructions for decoding a video signal stored thereon, the instructions, upon execution by the one or more processor, causing the computing device to:
      obtain a first reference picture and a second reference picture associated with a video sub-block, wherein the first reference picture is before a current picture and the second reference picture is after the current picture in a display order;
      obtain first prediction samples $I^{(0)}$ for samples in the video sub-block from the first reference picture;
      obtain second prediction samples $I^{(1)}$ for the samples in the video sub-block from the second reference picture;
      obtain motion refinements for the samples in the video sub-block by controlling bit-widths of intermediate parameters, wherein the intermediate parameters comprise one or a combination of following parameters: horizontal gradients, vertical gradients, and sample differences based on the first prediction samples $I^{(0)}$ and the second prediction samples $I^{(1)}$; and
      obtain bi-prediction samples for the samples in the video sub-block based on the motion refinements,
      wherein the controlling the bit-widths of the intermediate parameters comprises reducing the bit-widths of the horizontal gradients and the vertical gradients by a first bit-shift value, the first bit-shift value being greater than 4.

9. The computing device of claim 8, wherein the instructions, upon execution by the one or more processor, further cause the computing device to obtain the motion refinements for the samples in the video sub-block by, for one sample in the video sub-block:

obtaining a first horizontal gradient for said one sample based on a first prediction sample $I^{(0)}(i+1,j)$ and a first prediction sample $I^{(0)}(i-1,j)$, wherein i and j correspond to coordinates of the one sample;

obtaining a second horizontal gradient for said one sample based on a second prediction sample $I^{(1)}(i+1,j)$ and a second prediction sample $I^{(1)}(i-1,j)$;

obtaining a first vertical gradient for said one sample based on a first prediction sample $I^{(0)}(i,j+1)$ and a first prediction sample $I^{(0)}(i,j-1)$; and     obtaining a second vertical gradient for said one sample based on a second prediction sample $I^{(1)}(i,j+1)$ and a second prediction sample $I^{(1)}(i,j-1)$.

10. The computing device of claim 8, wherein the instructions, upon execution by the one or more processor, further cause the computing device to obtain the motion refinements for the samples in the video sub-block by, for one sample in the video sub-block:

obtaining a first correlation value, wherein the first correlation value is a sum of horizontal gradients of the first prediction samples $I^{(0)}$ and the second prediction samples $I^{(1)}$ with respect to said one sample;

obtaining a second correlation value, wherein the second correlation value is a sum of vertical gradients of the first prediction samples $I^{(0)}$ and the second prediction samples $I^{(1)}$ with respect to said one sample;

obtaining a modified first correlation value by right shifting the first correlation value using a second bit-shift value; and     obtaining a modified second correlation value by right shifting the second correlation value using a second bit-shift value.

11. The computing device of claim 10, wherein the instructions, upon execution by the one or more processor, further cause the computing device to obtain the motion refinements for the samples in the video sub-block by, for the one sample in the video sub-block:

obtaining a first modified prediction sample by right shifting a first prediction sample $I^{(0)}(i,j)$ for said one sample using a third bit-shift value;

obtaining a second modified prediction sample by right shifting a second prediction sample $I^{(1)}(i,j)$ for said one sample using the third bit-shift value; and     obtaining a sample difference for said one sample, wherein the sample difference is a difference between the first modified prediction sample and the second modified prediction sample.

12. The computing device of claim 11, wherein the second bit-shift value and the third bit-shift value are equal to one and four, respectively.

13. The computing device of claim 11, wherein the instructions, upon execution by the one or more processor, further cause the computing device to:

obtain a first internal summation value based on the sum of the first correlation values and the second correlation values within each 4×4 sub-block of the video block;

clip the first internal summation value based on a first parameter, wherein the first parameter controls an output bit-depth of the first internal summation value;

obtain a second internal summation value based on the sum of the second correlation values and the third correlation values within each 4×4 sub-block of the video block; and     clip the second internal summation value based on a second parameter, wherein the second parameter controls an output bit-depth of the second internal summation value.

14. The computing device of claim 13, wherein the first parameter is equal to 26 and the second parameter is equal to 28.

15. A non-transitory computer-readable storage medium storing instructions for decoding a video signal, the instructions, upon execution by a processor, causing the processor to:

obtain a first reference picture and a second reference picture associated with a video sub-block, wherein the first reference picture is before a current picture and the second reference picture is after the current picture in a display order;

obtain first prediction samples $I^{(0)}$ for samples in the video sub-block from the first reference picture;

obtain second prediction samples $I^{(1)}$ for the samples in the video sub-block from the second reference picture;

obtain motion refinements for the samples in the video sub-block by controlling bit-widths of intermediate parameters, wherein the intermediate parameters comprise one or a combination of following parameters: horizontal gradients, vertical gradients, and sample differences based on the first prediction samples $I^{(0)}$ and the second prediction samples $I^{(1)}$; and     obtain bi-prediction samples for the samples in the video sub-block based on the motion refinements,     wherein the controlling the bit-widths of the intermediate parameters comprises reducing the bit-widths of the horizontal gradients and the vertical gradients by a first bit-shift value, the first bit-shift value being greater than 4.

* * * * *